United States Patent [19]

Bodine

[11] Patent Number: 4,559,911
[45] Date of Patent: Dec. 24, 1985

[54] MODIFICATION OF DIESEL ENGINE PRECOMBUSTION CHAMBER TO ATTENUATE DETONATION AND IMPROVE COMBUSTION

[76] Inventor: Albert G. Bodine, 7877 Woodley Ave., Van Nuys, Calif. 91406

[21] Appl. No.: 150,456

[22] Filed: May 16, 1980

Related U.S. Application Data

[63] Continuation-in-part of Ser. No. 929,165, Jul. 28, 1978, Pat. No. 4,393,830.

[51] Int. Cl.$^4$ .............................................. F02B 27/00
[52] U.S. Cl. .................................... 123/271; 123/272; 123/293; 123/660
[58] Field of Search ................. 123/263, 293, 270–272, 123/280, 286, 660

[56] References Cited

U.S. PATENT DOCUMENTS

| | | | |
|---|---|---|---|
| 1,907,095 | 5/1933 | Adams | 123/293 |
| 2,520,378 | 8/1950 | Veit | 123/286 |
| 2,573,536 | 10/1951 | Bodine | 123/660 |
| 2,853,060 | 9/1958 | Hockel | 123/272 |
| 3,053,238 | 9/1962 | Meurer | 123/293 |
| 3,257,994 | 6/1966 | Clements et al. | 123/271 |
| 3,456,638 | 7/1969 | Bodine | 123/660 |
| 3,481,317 | 12/1969 | Hughes et al. | 123/280 |

*Primary Examiner*—Craig R. Feinberg
*Attorney, Agent, or Firm*—Edward A. Sokolski

[57] ABSTRACT

The precombustion chamber of a diesel engine is modified to incorporate an acoustical attenuator therein. Since the precombustion chamber is of fixed dimensions (not changed by piston movement), the acoustic nature and modification response are very powerful, to a surprising degree. In one embodiment of this invention, the attenuator is formed by a body of attenuative material, such as sintered metal or porous ceramic, which is placed around the lower portions of the chamber in the vicinity of the connecting passages to the main combustion chamber. In another embodiment, the attenuation is achieved by means of attenuator pockets which are spaced around the precombustion chamber with communication between these passages and the chamber being provided by means of suitable orifices, these pockets having an acoustic response such as to attenuate detonation waves. In a still further embodiment of the invention, the aforementioned pockets are filled with pellets fabricated of a porous material, such as a suitable porous ceramic or metallic ceramic, which are coated with a catalytic material, such as platinum or rhodium, the pellets providing additional acoustical attenuation with the catalytic material operating to facilitate more complete combustion.

9 Claims, 4 Drawing Figures

MODIFICATION OF DIESEL ENGINE PRECOMBUSTION CHAMBER TO ATTENUATE DETONATION AND IMPROVE COMBUSTION

This application is a continuation-in-part of my application Ser. No. 929,165, filed July 28, 1978, now U.S. Pat. No. 4,393,830.

This invention relates to precombustion chambers of diesel engines, and more particularly to the modification of such a precombustion chamber to acoustically suppress detonation waves and to catalytically facilitate combustion.

The precombustion chambers of diesel engines are often shaped in a general spherical configuration which tends to provide high Q acoustical cavities which acoustically amplify detonation waves generated in the combustion process. The substantially fixed dimensional nature of a precombustion chamber also makes possible an unexpected response to acoustic treatment which reduces combustion roughness. Such detonation waves, as pointed out in my U.S. Pat. No. 2,573,536, issued Oct. 30, 1951, not only hamper engine performance and provide undesirable noise, but also can result in damage to the engine such as enlargement of the bearings, buckling of crank pins, burning and cracking of pistons and rings, buckling of rods and cracking of the block or cylinder head. As described in the aforementioned patent, even in the disclosed variably dimensioned chambers, such detonation waves can be suppressed to some degree by providing acoustically suppressive material in suitable chambers adjacent to the combustion chamber or by providing acoustic suppression cavities in such locations even though the pistons' movement changes the chamber dimensions. As described in my co-pending application Ser. No. 929,165, filed July 28, 1978, of which the present invention is a continuation-in-part, such acoustical suppression can be combined with catalytic means on the acoustical damping material which simultaneously improves the combustion.

The present invention involves the modification of the effectively fixed dimension precombustion chamber of a diesel engine wherein both acoustical suppression and catalytic improvement of combustion may both be achieved using the same basic techniques as described in my aforementioned prior patent and patent application, but as modified for the unique fixed dimension nature of precombustion chambers.

In achieving the improvement of the present invention, the precombustion chamber of a diesel engine is modified to incorporate acoustical attenuator means in such chamber which modification can cooperate to a surprising degree with the fixed and predictable dimensions as regards the acoustics thereof. In one embodiment of the invention this attenuator means takes the form of an attenuator body which forms a belt around the lower hemispherical portion of the rigid chamber, with the attenuator body being fabricated of a porous body of sintered metal or porous ceramic having a porosity that provides the needed attenuative response to the gas vibration patterns in the chamber's permanent modes. In another embodiment of the invention, the attenuator means takes the form of a plurality of attenuator pockets which are located at predetermined locations around the outer wall of the fixed precombustion chamber and which are in fluid communication therewith through apertures formed in the wall of this chamber. In still another embodiment of the invention, the just-described pockets are filled with porous pellets of a suitable ceramic or metal material which pellets are coated with a catalytic material, thereby providing the dual functions of attenuating the detonation waves and aiding in combustion.

It is therefore an object of this invention to modify the fixed dimension precombustion chamber of a diesel engine to improve engine operation.

It is a further object of this invention to suppress detonation waves generated in a diesel engine by modifying the precombustion chambers thereof to incorporate acoustical attenuation means therein.

It is still a further object of this invention to attenuate detonation waves generated in a diesel engine while simultaneously aiding in the combustion of such engine by modifying primarily the internal acoustics of the precombustion chambers of such an engine to incorporate acoustical attenuators therein which have catalytic material thereon.

Other objects of this invention will become apparent as the description proceeds in connection with the accompanying drawings of which:

Figures 1, 2:
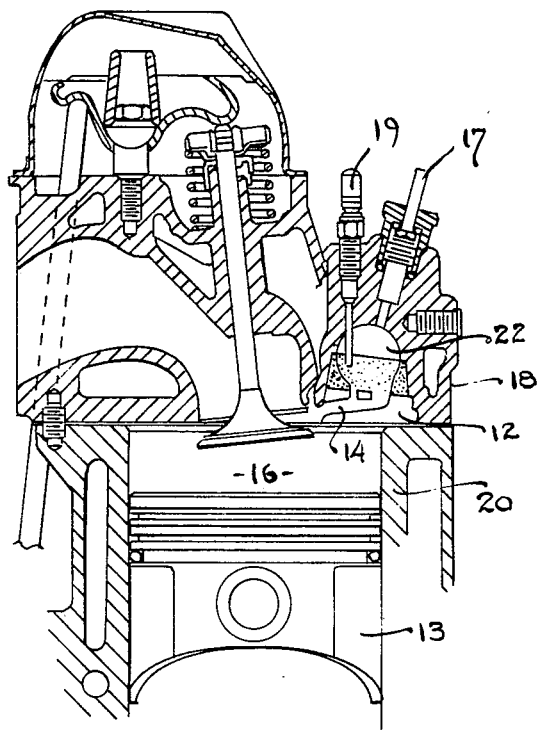
FIG. 1 is a cross-sectional view illustrating a diesel engine cylinder having an embodiment of the invention incorporated therein.
FIG. 2 is a cross-sectional view illustrating the precombustion chamber of a diesel engine modified in accordance with a first embodiment of the invention.

Referring now to FIGS. 1 and 2, a first embodiment of the invention is illustrated. A diesel engine 11 has a piston 13 which is installed in cylinder 16. A precombustion chamber 22 is connected to cylinder 16 by means of channel 14, there being an injector nozzle 17 for injecting fuel into the chamber and a glow igniter 19 for initiating combustion when the engine is started, as is conventional in most diesel engines.

As best can be seen in FIG. 2, attenuator member 12 includes a base portion 12a which has a spherical inner wall and an upper portion 12b which may be integrally formed with the base portion and which also has a spherical wall. The attenuator member is retained in the engine cylinder head 18 when the head is bolted onto cylinder block 20. The upper portion 12b of the attenuator member forms a belt which runs around the entire inner wall of the lower hemispherical portion of precombustion chamber 22. Attenuator member portion 12b is formed of a porous material, such as sintered metal or porous ceramic, which is capable of attenuating acoustical energy at the detonation frequencies encountered in the combustion chamber, as described in my aforementioned U.S. Pat. No. 2,573,536. A connecting passageway 14 is provided for interconnecting the precombustion chamber 22 and the main combustion chamber 16. Ports 42 are provided to broaden the frequency response of the attenuator and to provide an air flow path which tends to purge the cavities of carbon.

The attenuator 12, by covering the entire lower portion of the spherical wall of chamber 22 (i.e., almost all of the hemispherical portion below the equator 24 of the sphere), assures that attenuation is provided for practically all vibration modes of the permanently established architecture of precombustion chamber 22, this in view of the fact that every mode of such a fixed chamber has a high impedance region near the equator or in a 90° quadrant adjacent thereto. Under certain engine duty load conditions, the vibration mode that is normal to the plane of the drawing of FIG. 2 is the most significant one requiring suppression because the turbulence of rotation (indicated by arrow 50) of the gases induced by the flow into the precombustion chamber through channel 14, as indicated by arrow 46, tends to suppress any vibrational mode in the plane of the indicated rotation (which is also in the plane of channel 14). It is to be noted that channel 14 can engender a Helmholtz vibration mode for the precombustion chamber in addition to the internal spherical vibration modes which have been previously mentioned. The attenuator in view of its location on the lower hemisphere of the chamber will effectively be in a high impedance region and attenuate any Helmholtz vibration mode which may be engendered in channel 14 as well as the internal spherical vibration modes. The acoustical treatment thus can have a tightly coupled intimate effect that is surprisingly dominant in a precombustion chamber.

It is to be noted that the precombustion chamber of a diesel engine tends to develop a strong localized closed-loop phenomena wherein high level acoustic echoes of the sustained or fixed geometry tend to periodically raise the pressure and thus the temperature, which in turn augments these echoes. A generally spherical precombustion chamber can be modified very effectively to acoustically suppress this acoustical energy to the point where even the psychologically objectionable random diesel "click" noises so characteristic of diesel engines can be largely eliminated.

Figure 3:
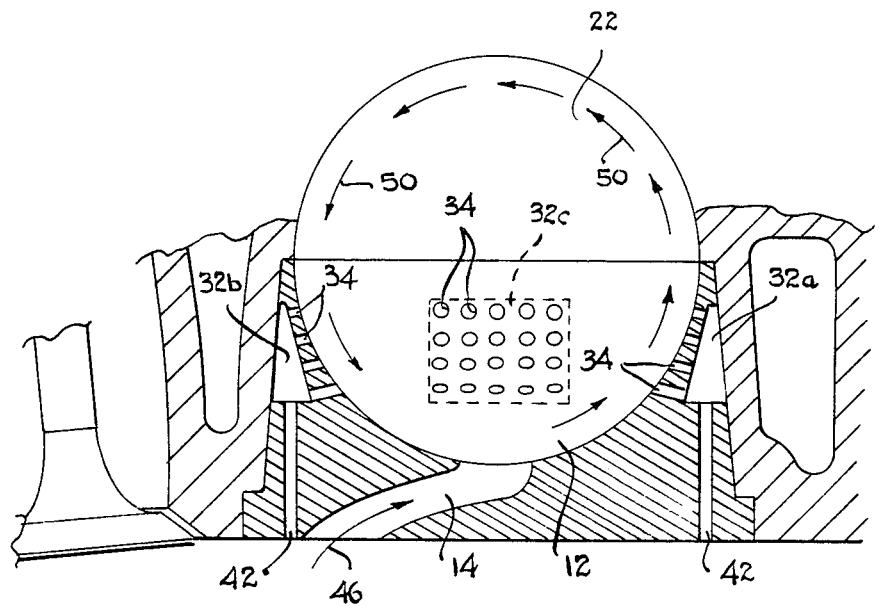
FIG. 3 is a cross-sectional view illustrating a diesel engine precombustion chamber having a second embodiment of the invention incorporated therein.

Referring now to FIG. 3, a second embodiment of the invention is illustrated. In this embodiment of the invention, rather than employing acoustical material for achieving suppression of the detonation waves, a plurality of acoustical pockets 32a–32c (fourth pocket opposite pocket 32c not shown) are employed. These pockets are located at 90° intervals around the lower hemisphere of chamber 22 and are in fluid communication with the chamber through apertures 34 formed in the walls of the chamber. Pockets 32a–32c are dimensioned to acoustically attenuate the more significant vibration modes encountered in the fixed chamber as generally described in my aforementioned U.S. Pat. No. 2,573,536 concerning normally variable chamber architecture. As has already been mentioned, in certain engine duty load conditions, the vibration mode that is normal to the plane of FIG. 3 is the most significant one requiring supression because the turbulence of rotation of the bases indicated by arrows 50 which is induced by flow 46 through channel 14 tends to suppress vibration modes in the plane of such rotation. Therefore, for some precombustion chamber engines or for particular engine duty loads, pocket 32c and the pocket thereopposite (not shown) can be employed for the attenuation without employing pockets 32a and 32b, thus avoiding interference by such pockets with the desirable combustion chamber turbulence engendered by the aerodynamics of the rotary turbulence indicated by arrows 50.

Attenuators 32a–32c provide their acoustical attenuation response by virtue of the ratio of the total area of perforations 40 to the volume of the pockets. Pockets 32a–32c provide a capacitive acoustic response at detonation frequencies which augments the inductive velocity of the gases in the properly sized perforations 34, thereby increasing the vibratory attenuation friction of the gases in the perforations at the frequencies of the gas vibration modes in precombustion chamber 22.

Where engine conditions are encountered that do not need the turbulence velocity afforded by smooth precombustion chamber wall surfaces of the rotary turbulence indicated by arrows 50, the perforations and pockets may be formed by an annular channel which runs completely around chamber 22 and has the needed orifices spaced around said annulus. Such a larger sized attenuator gives an acoustical attenuation response more like that of the first described embodiment.

Figure 4:
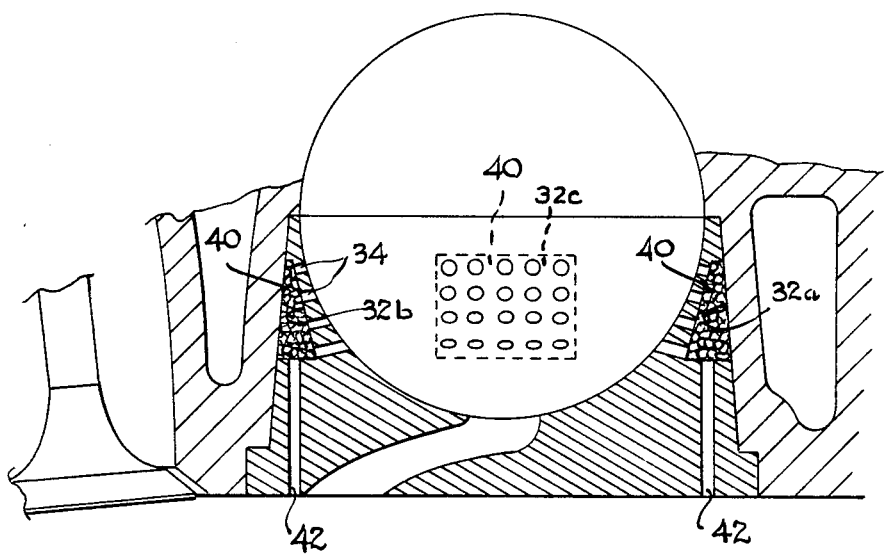
FIG. 4 is a cross-sectional view illustrating the precombustion chamber of a diesel engine having a third embodiment of the invention incorporated therein.

Referring now to FIG. 4, still a further embodiment of the invention is illustrated. In this embodiment, the pockets 32a, 32b, 32c are filled with pellets 40 which are fabricated of an acoustical attenuative material, such as a suitable porous ceramic or metallic ceramic, e.g. aluminum oxide, these pellets being coated with a suitable catalytic material, such as platinum or rhodium. The use of these pellets in the pockets tends to provide a tortuous flow resistive response to gas vibration modes at a high impedance region of such modes. As for the previous embodiments, ports 42 are provided both to broaden the frequency response of the attenuation and to provide an air flow path which tends to purge the cavities of carbon. The catalytic material on the porous pellets acts to aid in the combustion of the bases in the precombustion and combustion chambers. Thus, as for the invention of my co-pending application, of which the present application is a continuation-in-part, the cooperative synergistic effects of acoustical attenuation combined with the effects of the catalytic material are achieved.

Referring further to the use of porous ceramic material for portion 12b in FIG. 2, certain of these materials have low heat transmission characteristics and thus remain quite hot during normal engine operation. In this way, such material can be selected to provide a catalytic type effect simply because of the high temperature aiding the ignition of the fuel charge.

While my invention has been described and illustrated in detail, it is to be clearly understood that this is intended by way of illustration and example only and is not to be taken by way of limitation, the spirit and scope of this invention being limited only by the terms of the following claims.

I claim:

1. In a diesel engine having a precombustion chamber with an arcuate wall so as to provide a rotary turbulent flow path for air flowing thereto from the main combustion chamber, the improvement comprising:
   acoustical attenuator means having a high attenuative response to the gas vibrational energy present in said precombustion chamber, comprising a plurality of attenuator pockets spaced at predetermined locations around said precombustion chamber, apertures formed in the portions of the wall of the chamber opposite each of said pockets to provide fluid communications between the precombustion chamber and said pockets, and pellets of an acoustically attenuative material coated with a catalytic material contained within said pockets, and
   means for positioning said attenuator means around a predetermined portion of said precombustion chamber in a region thereof where maximum attenuation to said energy is provided.

2. In a diesel engine having a precombustion chamber with an arcuate wall so as to provide a rotary turbulent flow path for air flowing thereto from the main combustion chamber, the improvement comprising acoustical attenuator means having a high attenuative response to the gas vibrational energy present in said precombustion chamber, and means for positioning said attenuator means around a predetermined portion of said precombustion chamber in a region thereof where maximum attenuation to said energy is provided.

3. The engine of claim 2 wherein said attenuator means is positioned around substantially a predetermined half of the wall area of said chamber.

4. The engine of claim 2 wherein said precombustion chamber is substantially spherical, said attenuator means being positioned around a belt within a hemisphere of said precombustion chamber.

5. The engine of claim 2 or 4 wherein said attenuator means comprises an attenuator member having a first portion thereof which is formed of a porous acoustically attenuative material and a second portion thereof which forms a base support for said first portion, said first portion forming the wall of said predetermined portion of said precombustion chamber.

6. The engine of claim 5 and additionally including port means formed in said attenuator member for broadening the frequency response of the attenuator member.

7. The engine of claim 2 or 4 wherein said attenuator means comprises a plurality of attenuator pockets spaced at predetermined locations around said precombustion chamber, and apertures formed in the portions of the wall of the chamber opposite each of said pockets to provide fluid communications between the precombustion chamber and said pockets.

8. The engine of claim 7 wherein said pockets are spaced at ninety degree intervals around the wall of said precombustion chamber.

9. The engine of claim 7 and further including pellets of an acoustically attenuative material contained within said pockets.

* * * * *